US012348551B2

(12) United States Patent
Pelletier et al.

(10) Patent No.: US 12,348,551 B2
(45) Date of Patent: Jul. 1, 2025

(54) AUTOMATICALLY CLASSIFYING AND SCORING OF NETWORK VULNERABILITIES

(71) Applicant: Robert Bosch GmbH, Stuttgart (DE)

(72) Inventors: Zachariah Thomas Pelletier, Ypsilanti, MI (US); Golam Kayas, Philadelphia, PA (US); Timothy S. Arntson, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 18/185,635

(22) Filed: Mar. 17, 2023

(65) Prior Publication Data

US 2024/0223591 A1 Jul. 4, 2024

Related U.S. Application Data

(60) Provisional application No. 63/478,022, filed on Dec. 30, 2022.

(51) Int. Cl.
*H04L 9/40* (2022.01)
*H04L 41/16* (2022.01)

(52) U.S. Cl.
CPC ......... *H04L 63/1433* (2013.01); *H04L 41/16* (2013.01); *H04L 63/1425* (2013.01)

(58) Field of Classification Search
CPC .. H04L 63/1433; H04L 63/1425; H04L 41/16
See application file for complete search history.

(56) References Cited

U.S. PATENT DOCUMENTS

| 8,689,336 | B2 * | 4/2014 | Brock | H04L 63/1433 |
| | | | | 726/13 |
| 11,216,563 | B1 * | 1/2022 | Veselov | H04L 63/1433 |
| 2006/0277606 | A1 * | 12/2006 | Yunus | G06F 21/577 |
| | | | | 726/25 |
| 2013/0205397 | A1 * | 8/2013 | De Barros | H04L 63/1433 |
| | | | | 726/25 |

(Continued)

OTHER PUBLICATIONS

Holler, Christian, Kim Herzig, and Andreas Zeller, "Fuzzing with Code Fragments", 21st USENIX Security Symposium (USENIX Security 12), 2012. (Year: 2012).*

*Primary Examiner* — Nam T Tran
(74) *Attorney, Agent, or Firm* — Michael Best & Friedrich LLP

(57) ABSTRACT

A system includes a first electronic device having a display and an electronic processor configured to: determine an execution log including fuzzed data, extract text information from the execution log, generate an input vector from the extracted text information, provide the input vector to a trained neural network to generate an output vector, provide the output vector to a second trained machine learning model to determine output variables indicative of (i) a likelihood that the fuzzed data triggers the vulnerability in a second electronic device and (ii) a classification associated with the vulnerability, generate a display payload based on the output variables, generate revised computer executable instructions configured to prevent the second electronic device from malfunctioning in response to the second electronic device receiving data similar to the fuzzed data, and send the revised computer executable instructions to the second electronic device.

18 Claims, 16 Drawing Sheets

(56) References Cited

U.S. PATENT DOCUMENTS

| | | | |
|---|---|---|---|
| 2015/0026669 A1* | 1/2015 | Eddington | G06F 21/577 |
| | | | 717/137 |
| 2016/0099953 A1* | 4/2016 | Hebert | H04L 63/1433 |
| | | | 726/23 |
| 2018/0232523 A1* | 8/2018 | Copty | G06F 21/577 |
| 2021/0288991 A1* | 9/2021 | Shakarian | H04L 63/1433 |
| 2021/0288995 A1* | 9/2021 | Attar | H04L 63/1433 |
| 2023/0262086 A1* | 8/2023 | Connors | H04L 63/1433 |
| | | | 726/25 |

* cited by examiner

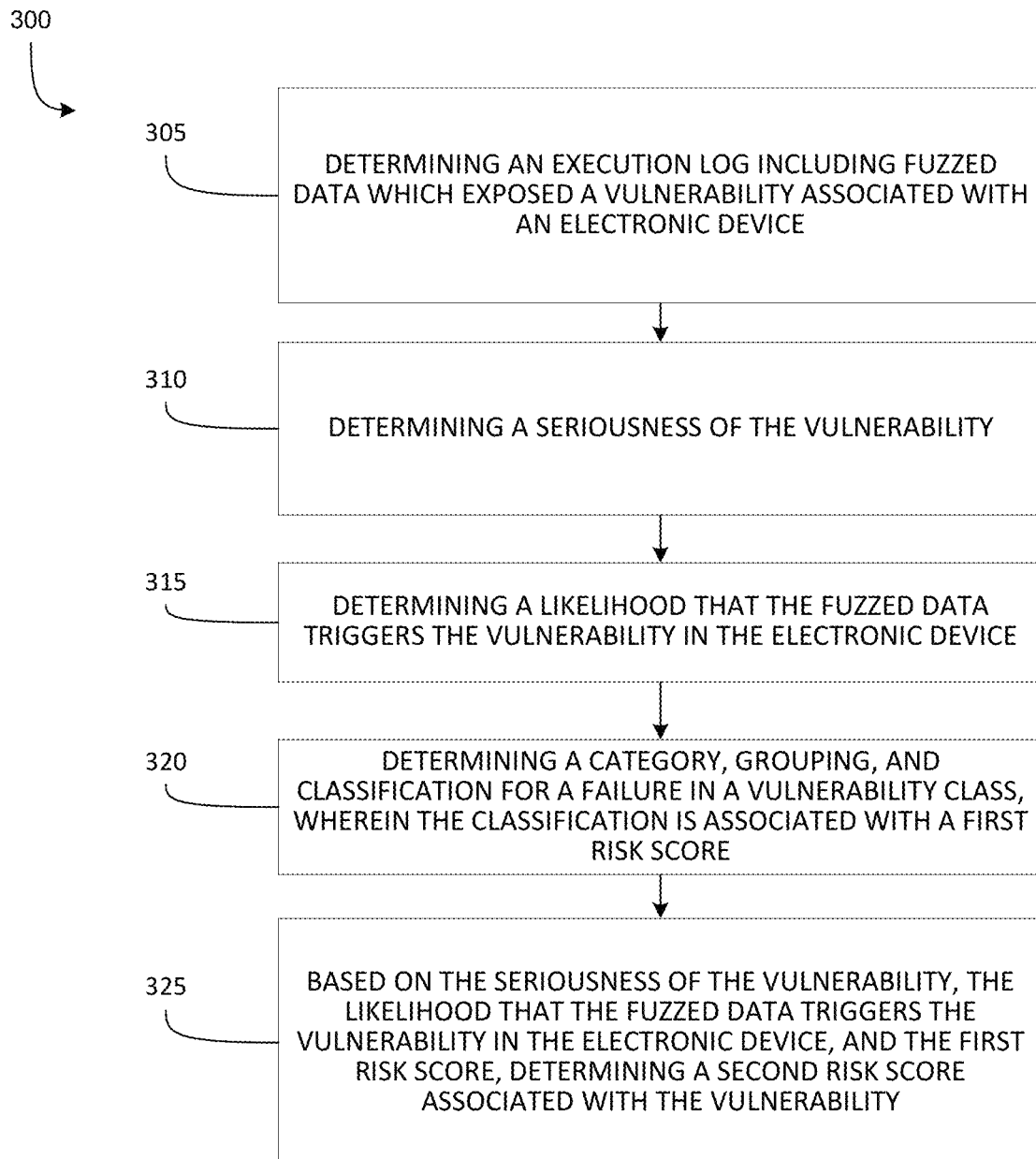

AUTOMATICALLY CLASSIFYING AND SCORING OF NETWORK VULNERABILITIES

CROSS-REFERENCE TO RELATED APPLICATIONS

This application claims the benefit under 35 U.S.C. § 119(e) of U.S. Provisional Patent Application No. 63/478,022 filed Dec. 30, 2022, the entire disclosure of which is incorporated by reference.

SUMMARY

It is important for software developers to test whether electronic devices connected via a communication network correctly handle receiving corrupt data. An example of electronic devices connected via a communication network is a plurality of electronic devices included in a vehicle that are connected by, for example, a control area network (CAN) bus. Incorrect handling of received corrupt data may cause an electronic device to become unresponsive, allow unauthorized access to the electronic device, or have other undesirable consequences. Thus, corrupt data can expose a vulnerability in the software of an electronic device by causing the electronic device to malfunction. It is important that software technicians or security testers know risks associated with vulnerabilities so that they know which vulnerabilities to address first.

Currently, a trained security tester must interpret raw execution log data to determine what risk (or classification) is associated with a vulnerability. In addition, a security tester must use their empirical knowledge and security testing experience to determine a risk score when examining vulnerabilities and their associated classifications. However, this is a time consuming and resource intensive process. The implementations described herein provide systems and methods for automatically classifying and scoring network vulnerabilities. The implementations described herein allow software technicians to more quickly address vulnerabilities in electronic devices.

One implementation provides a system for automatically determining vulnerability classifications without assistance from a human tester. Another implementation provides a system for automatically determining network robustness issues without assistance from a human tester. Another implementation provides a method for determining the relative severity of either security vulnerabilities or network robustness issues in relation to a network stack implementation. Another implementation provides a system for using historical data from previous testing of the same class of network or a similar implementation to provide a confidence level that the security vulnerability or network robustness issue is systemic. For example, the system may automatically group distinct security vulnerabilities or robustness issues as related to a similar implementation flaw at the network level.

One implementation provides a system for automatically classifying and scoring network vulnerabilities. The system includes an electronic device and an electronic processor. The electronic processor is configured to determine an execution log including fuzzed data which exposed a vulnerability associated with the electronic device. The electronic processor is also configured to determine a seriousness of the vulnerability, determine a likelihood that the fuzzed data triggers the vulnerability in the electronic device, and determine a classification associated with the vulnerability, wherein the classification is associated with a first risk score. The electronic processor is also configured to, based on the seriousness of the vulnerability, the likelihood that the fuzzed data triggers the vulnerability in the electronic device, and the first risk score, determine a second risk score associated with the vulnerability.

Another implementation provides a method for automatically classifying and scoring network vulnerabilities. The method includes determining an execution log including fuzzed data which exposed a vulnerability associated with an electronic device. The method also includes determining a seriousness of the vulnerability, determining a likelihood that the fuzzed data triggers the vulnerability in the electronic device, and determining a classification associated with the vulnerability, wherein the classification is associated with a first risk score. The method also includes, based on the seriousness of the vulnerability, the likelihood that the fuzzed data triggers the vulnerability in the electronic device, and the first risk score, determining a second risk score associated with the vulnerability.

A system includes a first electronic device having a display and an electronic processor configured to: determine an execution log including fuzzed data that exposes a vulnerability associated with a second electronic device, extract text information from the execution log, generate an input vector from the extracted text information, provide the input vector to a trained neural network having (i) an input layer, (ii) a hidden layer, and (iii) an output layer to generate an output vector, provide the output vector to a second trained machine learning model to determine output variables indicative of (i) a likelihood that the fuzzed data triggers the vulnerability in the second electronic device and (ii) a classification associated with the vulnerability, generate a display payload based on the output variables, generate revised computer executable instructions configured to prevent the second electronic device from malfunctioning in response to the second electronic device receiving data similar to the fuzzed data, and send the revised computer executable instructions to the second electronic device.

The trained neural network is configured to generate the output vector by: providing the input vector to nodes of the input layer, generating outputs from nodes of the input layer by multiplying the input vector by a weight, providing outputs from nodes of the input layer to nodes of the hidden layer, providing outputs from nodes of the hidden layer to nodes of the output layer, and generating the output vector from nodes of the output layer. The display is configured to generate, based on the display payload, a visual representation indicative of (i) the likelihood that the fuzzed data triggers the vulnerability in the second electronic device and (ii) the classification associated with the vulnerability. The execution log includes a transmission frame, a receipt frame, and one or more subsequent health-check frames, In other features, the electronic processor is configured to generate an availability metric based on the execution log, generate a reproducibility metric based on the execution log, and provide the availability metric and the reproducibility metric to the second trained machine learning model to determine the output variables. In other features, the electronic processor is configured to generate multiple output variables based on the execution log, determine a consensus metric based the multiple output variables, and generate an output payload based on the consensus metric.

In other features, the multiple output variables include (i) a first likelihood that the fuzzed data triggers the vulnerability in the second electronic device, (ii) a second likelihood that the fuzzed data triggers the vulnerability in the second electronic device, and (iii) a classification associated with the vulnerability. The electronic processor is configured to: determine an average probability that the fuzzed data triggers the vulnerability in the second device based on the first likelihood and the second likelihood and, in response to the average probability that the fuzzed data triggers the vulnerability in the second device being greater than an average probability that the fuzzed data does not trigger the vulnerability in the second device, generate the consensus metric. The consensus metric is indicative of the classification associated with the vulnerability.

A system for automatically classifying and scoring network vulnerabilities includes an electronic device and an electronic processor. The electronic processor is configured to determine an execution log including fuzzed data which exposed a vulnerability associated with the electronic device, determine a seriousness of the vulnerability, determine a likelihood that the fuzzed data triggers the vulnerability in the electronic device, determine a classification associated with the vulnerability. The classification is associated with a first risk score, and determine a second risk score associated with the vulnerability based on the seriousness of the vulnerability, the likelihood that the fuzzed data triggers the vulnerability in the electronic device, and the first risk score. In other features, the electronic processor is further configured to receive revised computer executable instructions configured to prevent the electronic device from malfunctioning when the electronic device receives data similar to the fuzzed data and send the revised computer executable instructions to the electronic device. The electronic device replaces computer executable instructions that were previously stored in its memory with the revised computer executable instructions.

In other features, the electronic processor is configured to determine a classification associated with the vulnerability using machine learning. In other features, the electronic processor is further configured to determine a confidence value associated with the classification, determine, based on the first risk score and the confidence value, a modified first risk score, and determine the second risk score associated with the vulnerability based on the seriousness of the vulnerability, the likelihood that the fuzzed data triggers the vulnerability in the electronic device, the first risk score, and the modified first risk score. In other features, the electronic processor is further configured to parse the execution log to determine one or more testcases included in the execution log. One or more of the parsed testcases includes fuzzed data which exposed a vulnerability associated with the electronic device. The electronic processor is further configured to, for each parsed testcase including fuzzed data which exposed a vulnerability associated with the electronic device, generate a reduced testcase including the fuzzed data which exposed a vulnerability and generate a reduced execution log.

In other features, the electronic processor is configured to determine a seriousness of the vulnerability by sending the reduced testcase to the electronic device and determining an amount of time that the electronic device is unresponsive for when the electronic device receives the reduced testcase. In other features, the electronic processor is configured to determine a likelihood that the fuzzed data triggers the vulnerability in the electronic device by sending the reduced testcase to the electronic device a predetermined number of times and determining a percentage representing how often the reduced testcase exposes the vulnerability. In other features, the electronic processor is configured to determine a classification associated with the vulnerability by using machine learning to analyze the reduced execution log.

A method for automatically classifying and scoring network vulnerabilities includes determining an execution log including fuzzed data which exposed a vulnerability associated with an electronic device, determining a seriousness of the vulnerability, determining a likelihood that the fuzzed data triggers the vulnerability in the electronic device, and determining a classification associated with the vulnerability. The classification is associated with a first risk score. The method includes determining a second risk score associated with the vulnerability based on the seriousness of the vulnerability, the likelihood that the fuzzed data triggers the vulnerability in the electronic device, and the first risk score.

In other features, the method further includes receiving revised computer executable instructions configured to prevent the electronic device from malfunctioning when the electronic device receives data similar to the fuzzed data and sending the revised computer executable instructions to the electronic device. The electronic device replaces computer executable instructions that were previously stored in its memory with the revised computer executable instructions. In other features, determining a classification associated with the vulnerability includes using machine learning. In other features, the method further includes determining a confidence value associated with the classification, determining, based on the first risk score and the confidence value, a modified first risk score, and determining the second risk score associated with the vulnerability based on the seriousness of the vulnerability, the likelihood that the fuzzed data triggers the vulnerability in the electronic device, the first risk score, and the modified first risk score.

In other features, the method further includes parsing the execution log to determine one or more testcases included in the execution log. One or more of the parsed testcases includes fuzzed data which exposed a vulnerability associated with the electronic device. The method includes, for each parsed testcase including fuzzed data which exposed a vulnerability associated with the electronic device, generating a reduced testcase including the fuzzed data which exposed a vulnerability and generating a reduced execution log. In other features, determining a seriousness of the vulnerability includes sending the reduced testcase to the electronic device and determining an amount of time that the electronic device is unresponsive for when the electronic device receives the reduced testcase. In other features, determining a likelihood that the fuzzed data triggers the vulnerability in the electronic device includes sending the reduced testcase to the electronic device a predetermined number of times and determining a percentage representing how often the reduced testcase exposes the vulnerability. In other features, determining a classification associated with the vulnerability includes using machine learning to analyze the reduced execution log.

Other aspects, features, and embodiments will become apparent by consideration of the detailed description and accompanying drawings. The detailed description and specific examples are intended for purposes of illustration only and are not intended to limit the scope of the disclosure.

BRIEF DESCRIPTION OF THE DRAWINGS

FIG. 3 is a flowchart of a method of using the system of FIG. 1 to automatically classify and score network vulnerabilities according to one example.

DETAILED DESCRIPTION

Before any implementations are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various instances of the invention. In addition, implementations may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
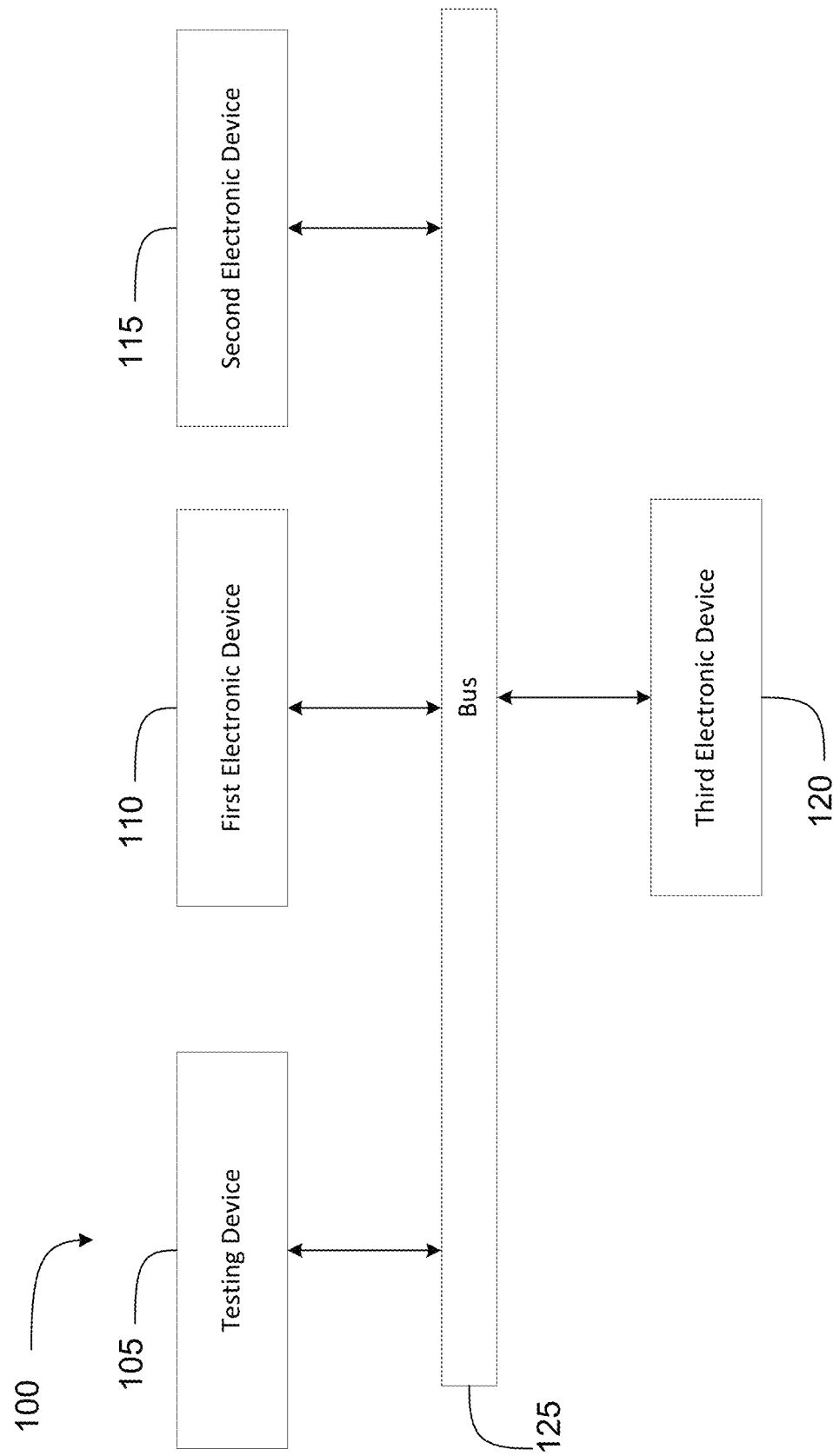
FIG. 1 is a block diagram of a system for automatically classifying and scoring network vulnerabilities according to one example.

FIG. 1 illustrates a system 100 for automatically classifying and scoring network vulnerabilities. In the example illustrated, the system 100 includes a testing device 105 (which is an electronic device), a first electronic device 110, a second electronic device 115, and a third electronic device 120 (referred to herein as electronic devices 110, 115, 120) connected via a communication network 125. In some implementations, the electronic devices 110, 115, 120 are electronic control units (ECUs). While the communication network 125 is illustrated herein as a bus (for example a CAN bus), the communication network 125 may be implemented using other network protocols and other network modalities including, for example a wide area network, such as the Internet, a local area network, such as a Wi-Fi network, short-range wireless networks, such as a Bluetooth™ network, near field communication connections, and combinations or derivatives thereof. The embodiment illustrated in FIG. 1 provides but one example of the components and connections of the system 100. In other embodiments, these components and connections may be constructed in other ways than those illustrated and described herein. For example, the system 100 may include a different number of electronic devices than the four electronic devices illustrated in FIG. 1.

Figure 2A:
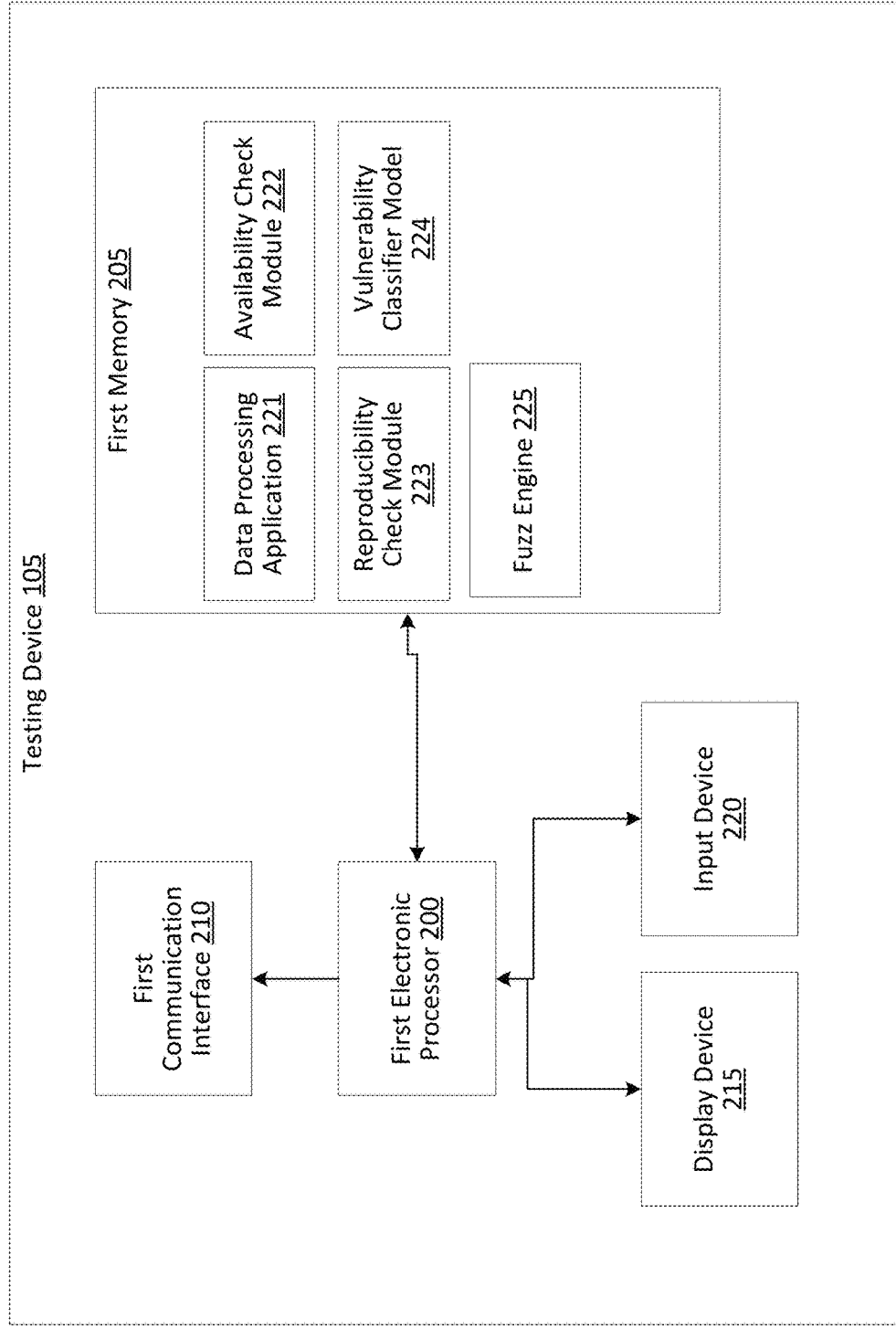
FIG. 2A is a block diagram of a testing device of the system of FIG. 1 according to one example.

FIG. 2A is a block diagram of an example of the testing device 105 of the system 100 of FIG. 1. The testing device 105 includes a plurality of electrical and electronic components that provide power, operation control, and protection to the components and modules within the testing device 105. The testing device 105 includes, among other things, a first electronic processor 200 (such as a programmable electronic microprocessor, microcontroller, or similar device), a first memory 205 (for example, non-transitory, computer or machine readable memory), a first communication interface 210, a display device 215, and an input device 220. The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a keypad, a mouse, a touchscreen (for example, as part of the display device 215), a microphone, a camera, or the like. The first electronic processor 200 is communicatively connected to the first memory 205, first communication interface 210, display device 215, and input device 220. The first electronic processor 200, in coordination with the first memory 205 and the first communication interface 210, is configured to implement, among other things, the methods described herein. In some implementations, the first memory 205 includes a data processing application 221, an availability check module 222, a reproducibility check module 223, and a vulnerability classifier model 224. The data processing application 221, availability check module 222, reproducibility check module 223, and vulnerability classifier model 224 are, for example, software modules that the first electronic processor 200 executes to perform the methods described herein. In some implementations, the first memory 205 also includes a fuzz engine 225. The fuzz engine 225 may be a software module which the first electronic processor 200 executes to generate fuzzed data, test an electronic device (for example, the first electronic device 110), and create an execution log. The testing device 105 may contain sub-modules that include additional electronic processors, memory, or application specific integrated circuits (ASICs) for handling communication functions, processing of signals, and application of the methods listed below. In some implementations, the testing device 105 includes additional, fewer, or different components. In some implementations, the functionality described as being performed by the testing device 105 may be distributed amongst multiple devices.

Figure 2B:
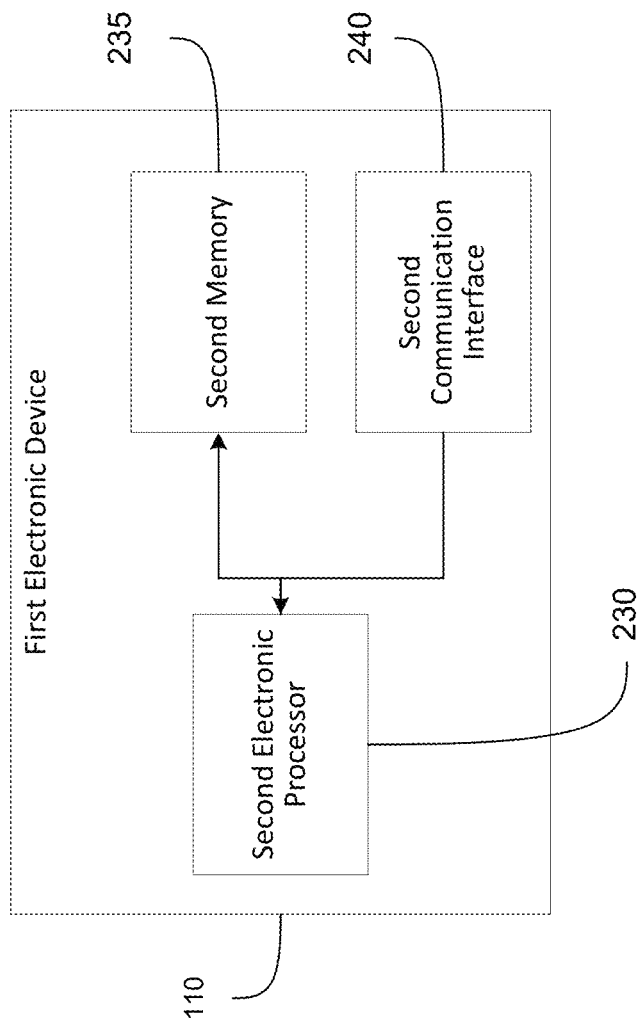
FIG. 2B is a block diagram of a first electronic device of the system of FIG. 1 according to one example.

FIG. 2B is a block diagram of the first electronic device 110 of the system 100 of FIG. 1. The first electronic device 110 includes a plurality of electrical and electronic components that provide power, operation control, and protection to the components and modules within the first electronic device 110. The first electronic device 110 includes, among other things, a second electronic processor 230 (such as a programmable electronic microprocessor, microcontroller, or similar device), a second memory 235 (for example, non-transitory, computer or machine readable memory), and a second communication interface 240. The second electronic processor 230 is communicatively connected to the second memory 235 and the second communication interface 240. The first electronic device 110 may contain sub-modules that include additional electronic processors, memory, or application specific integrated circuits (ASICs) for handling communication functions, processing of signals, and application of the methods listed below. In some implementations, the first electronic device 110 includes additional, fewer, or different components. Although not illustrated herein it should be noted that the second electronic device 115 and third electronic device 120 include components and connections similar to those illustrated in FIG. 2B as being included in the first electronic device 110. Additionally, the second electronic device 115 and third electronic device 120 perform functionality similar to the functionality described herein as being performed by the first electronic device 110.

FIG. 3 is a flow chart illustrating an example method 300 for automatically classifying and scoring network vulnerabilities. In some implementations, the method 300 begins at step 305 when the first electronic processor 200 determines an execution log including fuzzed data which exposed a vulnerability associated with an electronic device (for example, the first electronic device 110). The execution log includes, for one or more testcases, one or more messages sent to the first electronic device 110 (fuzzed data), messages received from the first electronic device 110, instrumentation requests, verdicts, a combination of the foregoing, or the like. In some implementations, the first electronic processor 200 creates the execution log. In other implementations, the first electronic processor 200 receives the execution log.

Figure 4:
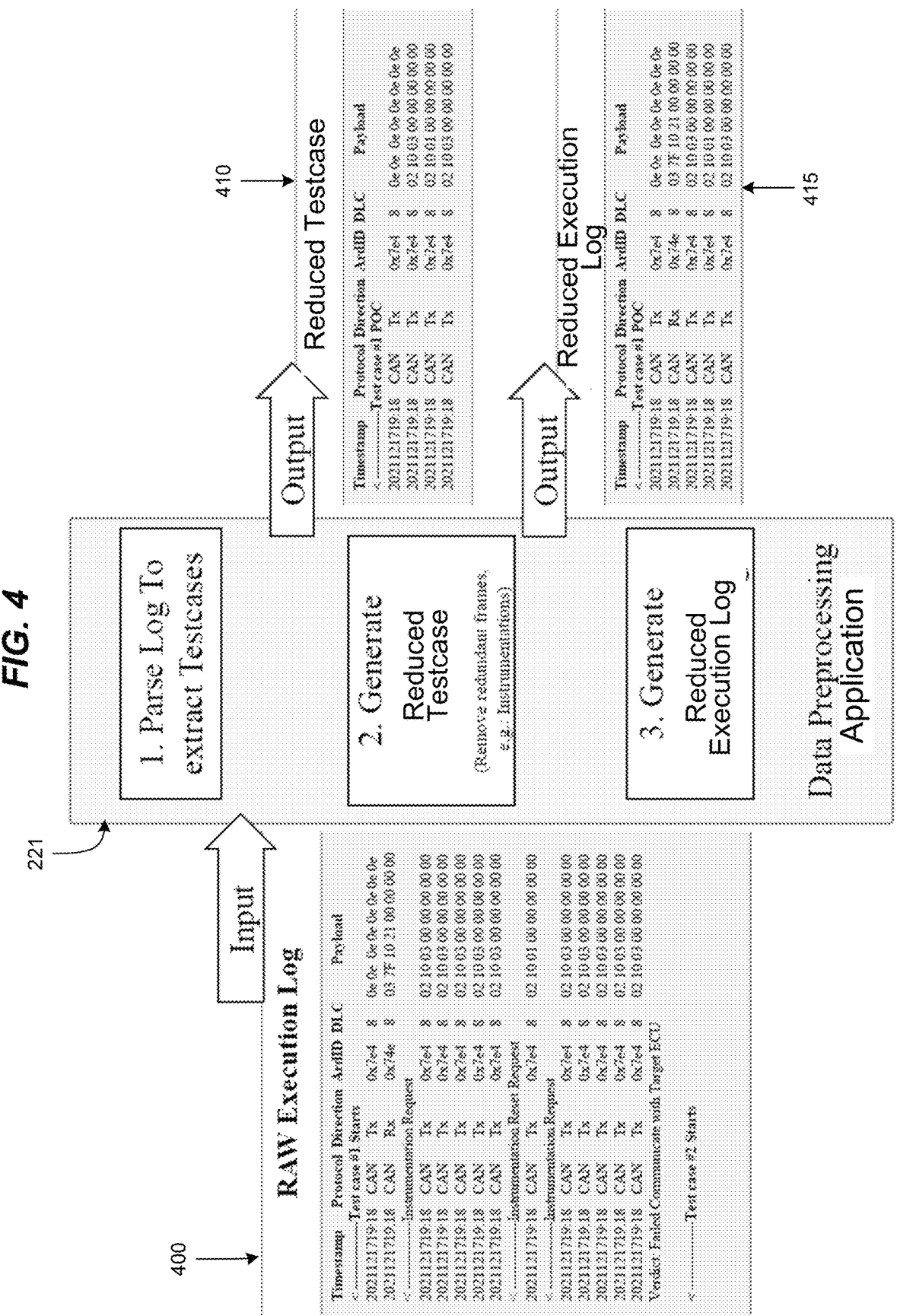
FIG. 4 is an illustrative example of data in an execution log being preprocessed to generate a reduced testcase and a reduced execution log.

In some implementations, the first electronic processor 200 may preprocess data included in the execution log by determining or parsing one or more testcases included in the execution log. One or more testcases determined by the first electronic processor 200 include fuzzed data which exposed a vulnerability associated with the first electronic device 110. In some implementations, testcases which exposed a vulnerability associated with the first electronic device 110 are associated with a "failed" verdict in the execution log. In some implementations, for each parsed testcase with a failed verdict, the first electronic processor 200 generates a minimal reduced testcase including the fuzzed data which exposed a vulnerability and generates a reduced execution log. A reduced test case, in some instances, refers to a test case that represents an underlying issue or security vulnerability, of which several different test cases could be failing in a similar way. In some implementations, the first electronic processor 200 generates the reduced testcase by removing received messages, redundant sent messages, verdicts, and instrumentation requests from the parsed testcase. In some implementations, the first electronic processor 200 generates the reduced execution log by removing redundant sent messages, verdicts, and instrumentation requests from the parsed testcase. FIG. 4 provides an illustrative example of data in an execution log 400 being preprocessed (for example, when the first electronic processor 200 executes the data processing application 221) to generate a reduced testcase 410 and a reduced execution log 415.

In some scenarios, a testcase may not appeared to have triggered a vulnerability in an electronic device (appears to be a "passing" testcase) yet did contribute to an issue or vulnerability that is testcase order-dependent. Issues that are testcase order-dependent require specific sequences of testcases to expose the vulnerability and cause the electronic device to malfunction. The first electronic processor 200 may determine that an issue is testcase order-dependent when a testcase associated with a failed verdict in the execution log does not expose a vulnerability when the first electronic processor 200 performs the steps 310-325 of the method 300 using the testcase. In these scenarios, the first electronic processor 200 may perform steps 310-325 using a reduced execution log and reduced testcase which includes the testcase associated with a failed verdict as well as one or more of the immediately preceding passing testcases in the execution log. In some implementations, the first electronic processor 200 iteratively adds the most immediately preceding testcase included in the execution log to the reduced testcase and the reduced execution log and performs steps 310-325 until the vulnerability in the electronic device is exposed and, therefore, the sequence of testcases required to expose the vulnerability is determined.

Figure 5:
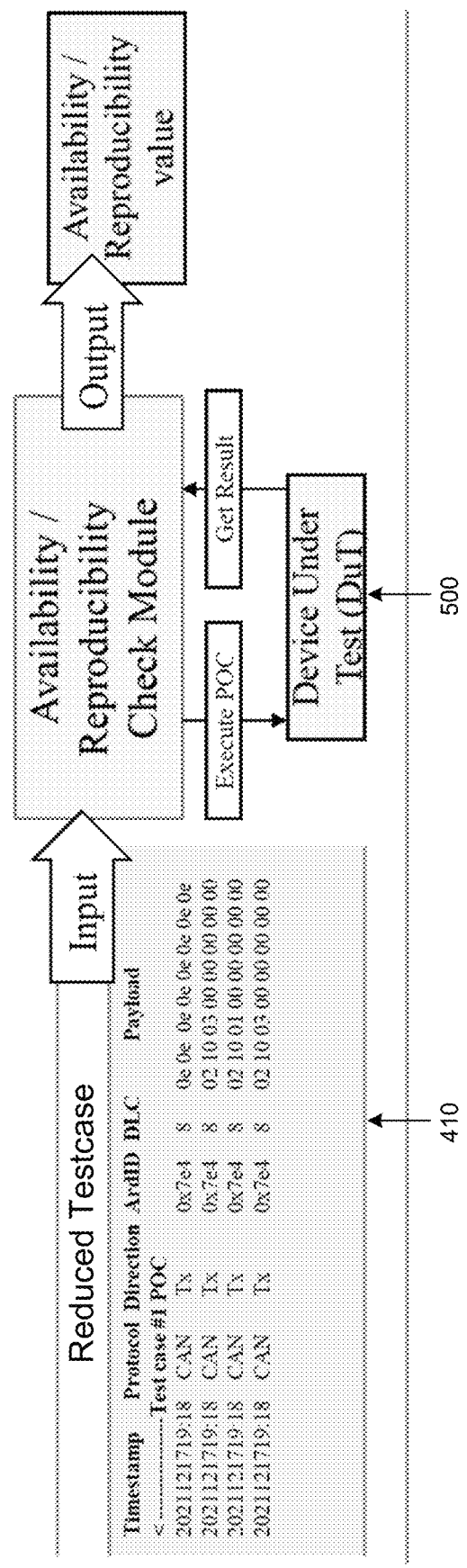
FIG. 5 is an illustrative example of determining the seriousness of the vulnerability and determining a likelihood that the fuzzed data triggers the vulnerability in the electronic device.

At step 310, the first electronic processor 200 determines a seriousness of the vulnerability. In some implementations, the first electronic processor 200 determines the seriousness of the vulnerability when it executes the availability check module 222. FIG. 5 provides an illustrative example of determining the seriousness of the vulnerability. As illustrated in FIG. 5, the first electronic processor 200 may determine the seriousness associated with the vulnerability by sending the reduced testcase 410 to the first electronic device 110 (the device under test 500 in FIG. 5) and determining an amount of time that the first electronic device 110 is unresponsive when the first electronic device 110 receives the reduced testcase 410. In some implementations, the first electronic processor 200 determines an availability score (a value) representative of the seriousness of the vulnerability. For example, the availability score may range from 1 to 100 with 1 being the least serious vulnerability and 100 being the most serious vulnerability. For example, when the first electronic device 110 is unresponsive for 3 minutes after receiving the reduced testcase 410, the first electronic processor 200 may determine that the availability score is 90 and when the first electronic device 110 is unresponsive for 5 seconds after receiving the reduced testcase 410, the first electronic processor 200 may determine that the availability score is 10.

At step 315, the first electronic processor 200 determines a likelihood that the fuzzed data triggers the vulnerability in the electronic device (for example, the first electronic device 110). In some implementations, the first electronic processor 200 determines the likelihood that the fuzzed data triggers the vulnerability in the first electronic device 110, when the first electronic processor 200 executes the reproducibility check module 223. FIG. 5 provides an illustrative example of determining a likelihood that the fuzzed data triggers the vulnerability in the electronic device. In some implementations, the first electronic processor 200 determines the likelihood by sending the reduced testcase 410 to the first electronic device 110 a predetermined number of times and determining a percentage representing how often the reduced testcase 410 exposes the vulnerability. For example, the first electronic processor 200 sends the reduced testcase 410 to the first electronic device 110 (the device under test 500 in FIG. 5) 100 times and, when the first electronic device 110 malfunctions 30 times, the first electronic processor 200 determines that the reproducibility score or the likelihood that the fuzzed data triggers the vulnerability in the first electronic device 110 is 0.3 or 30%.

At step 320, the first electronic processor 200 determines a classification associated with the vulnerability. For example, step 320 includes the first electronic processor 200 determining a category, grouping, and classification for a failure or vulnerability in a vulnerability class. In some instances, the classification is associated with a first risk score. In some implementations, the first electronic processor 200 also determines a confidence value associated with the classification. In some implementations, the first electronic processor 200 determines the classification associated with the vulnerability and the confidence value associated with the classification when the first electronic processor 200 executes the vulnerability classifier model 224. In some implementations, the vulnerability classifier model 224 includes a machine learning model such as a neural network, a logistic regression, or the like. In some implementations, the vulnerability classifier model 224 is trained using a plurality of reduced execution logs (including messages sent to and received from an electronic device) that are labeled with vulnerability classifications. For example, the reduced execution logs used as training data may be labeled by trained security experts. In some implementations, the first electronic processor 200, receives feedback (via, for example, the input device 220) regarding the classification the first electronic processor 200 generates for a reduced execution log. For example, the first electronic processor 200 receives the correct classification for the vulnerability or confirmation from a trained security tester that it correctly classified the vulnerability. In some implementations, the vulnerability classifier model 224 is periodically retrained using the feedback.

Figure 6:
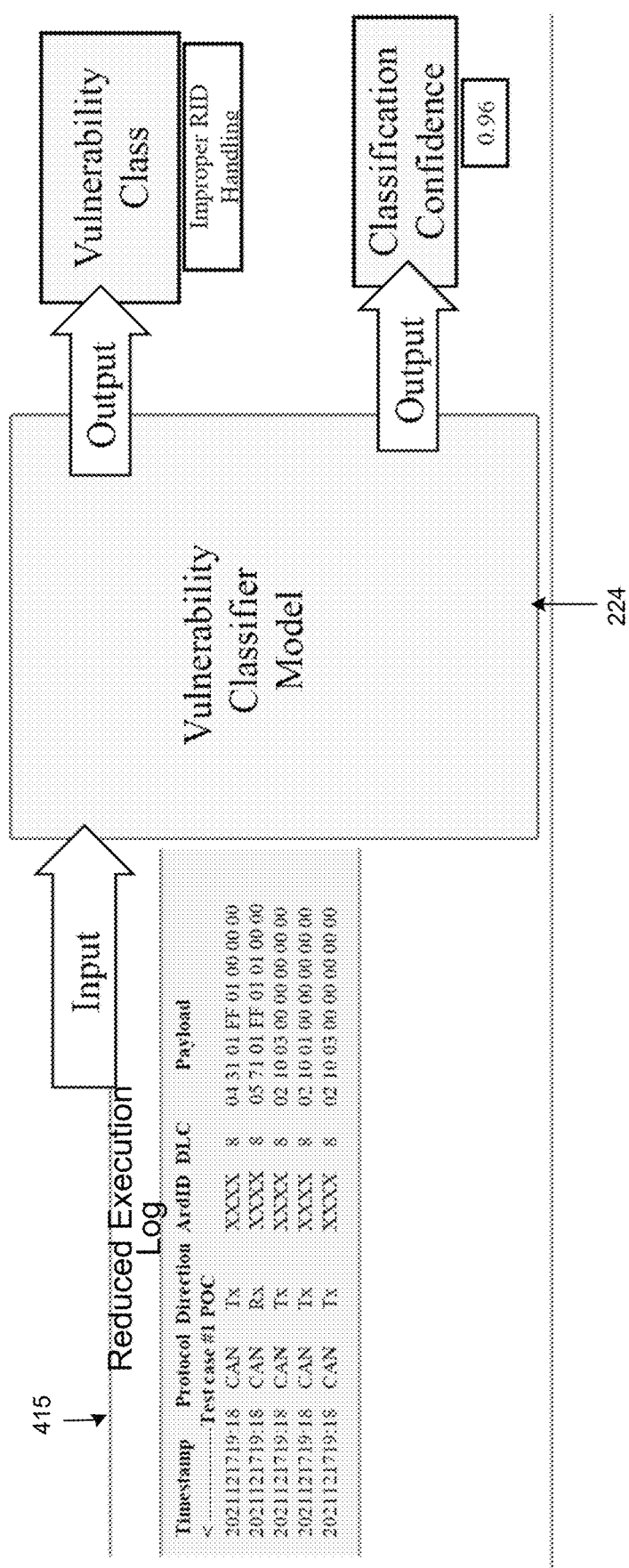
FIG. 6 provides an illustrative example of determining a classification associated with the vulnerability and a confidence value associated with the classification.

FIG. 6 provides an illustrative example of determining a classification associated with the vulnerability and a confidence value associated with the classification. In some implementations, the vulnerability classifier model 224 analyzes the reduced execution log 415 to determine a classification associated with the vulnerability and a confidence value representing the likelihood that the first electronic processor 200 has correctly classified the vulnerability. In the example illustrated in FIG. 6, the first electronic processor 200 (executing the vulnerability classifier model 224) determines, based on the reduced execution log 415, that the classification associated with the vulnerability is "Improper RID Handling" and the confidence score associated with the classification is 0.96. In some implementations, each classification is associated with a first risk score. For example, the first risk score may a value between 1 and 100, with 1 being the least risky vulnerability and 100 being the most risky vulnerability. For example, the "Improper RID Handling" classification in FIG. 6 may be associated with a first risk score of 50. A trained security tester may assign a first risk score to each possible classification based on their experience in identifying and addressing vulnerabilities in electronic devices.

At step 325, the first electronic processor 200, based on the seriousness of the vulnerability (the availability score), the likelihood that the fuzzed data will trigger the vulnerability in the electronic device (the reproducibility score), and the first risk score, determines a second risk score associated with the vulnerability. In one example, the first electronic processor 200 determines the second risk score using an algorithm such as a weighted average calculation, a Common Vulnerability Scoring System (CVSS) (described at https://nvd.nist.gov/vuln-metrics/cvss), or the like. In some implementations, the algorithm used to generate the second risk score is also a machine learning algorithm that is trained using labeled data and is retrained as new labeled data becomes available (for example, through the security testing of new types of electronic devices).

In some implementations, the first electronic processor 200 uses the confidence value to determine the second risk score in addition to the seriousness of the vulnerability, the likelihood that the fuzzed data will trigger the vulnerability in the electronic device, and the classification associated with the vulnerability. For example, the first electronic processor 200 multiplies the first risk score by the confidence value to generate a modified first risk score. The first electronic processor 200 then calculates the second risk score using the seriousness of the vulnerability, the likelihood that the fuzzed data will trigger the vulnerability in the electronic device, and the modified first risk score.

Figure 7:
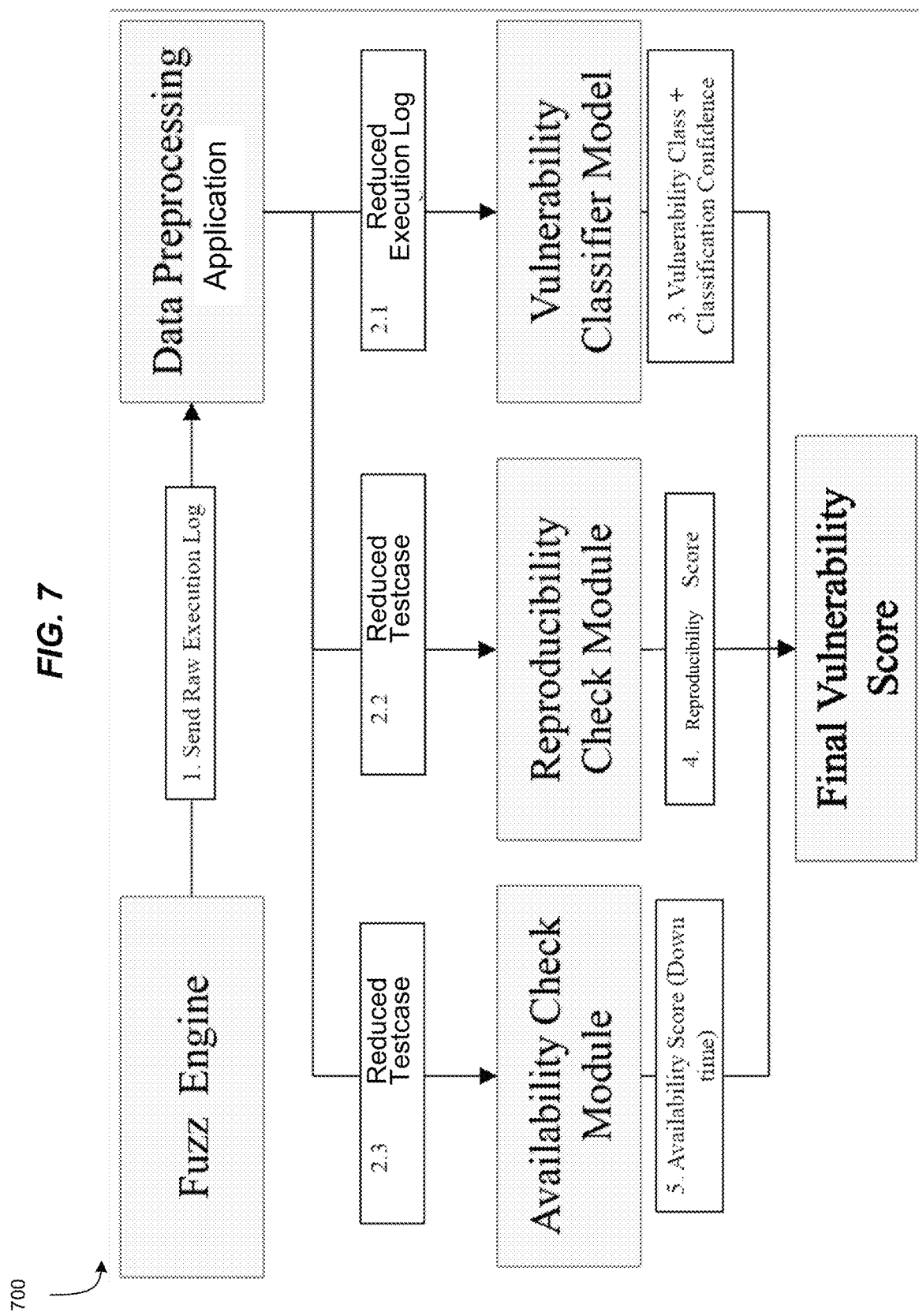
FIG. 7 is an additional example flowchart of the functionality performed in the method of FIG. 3.

FIG. 7 provides an additional example flowchart 700 of the functionality described above in relation to the method 300.

Figure 8:
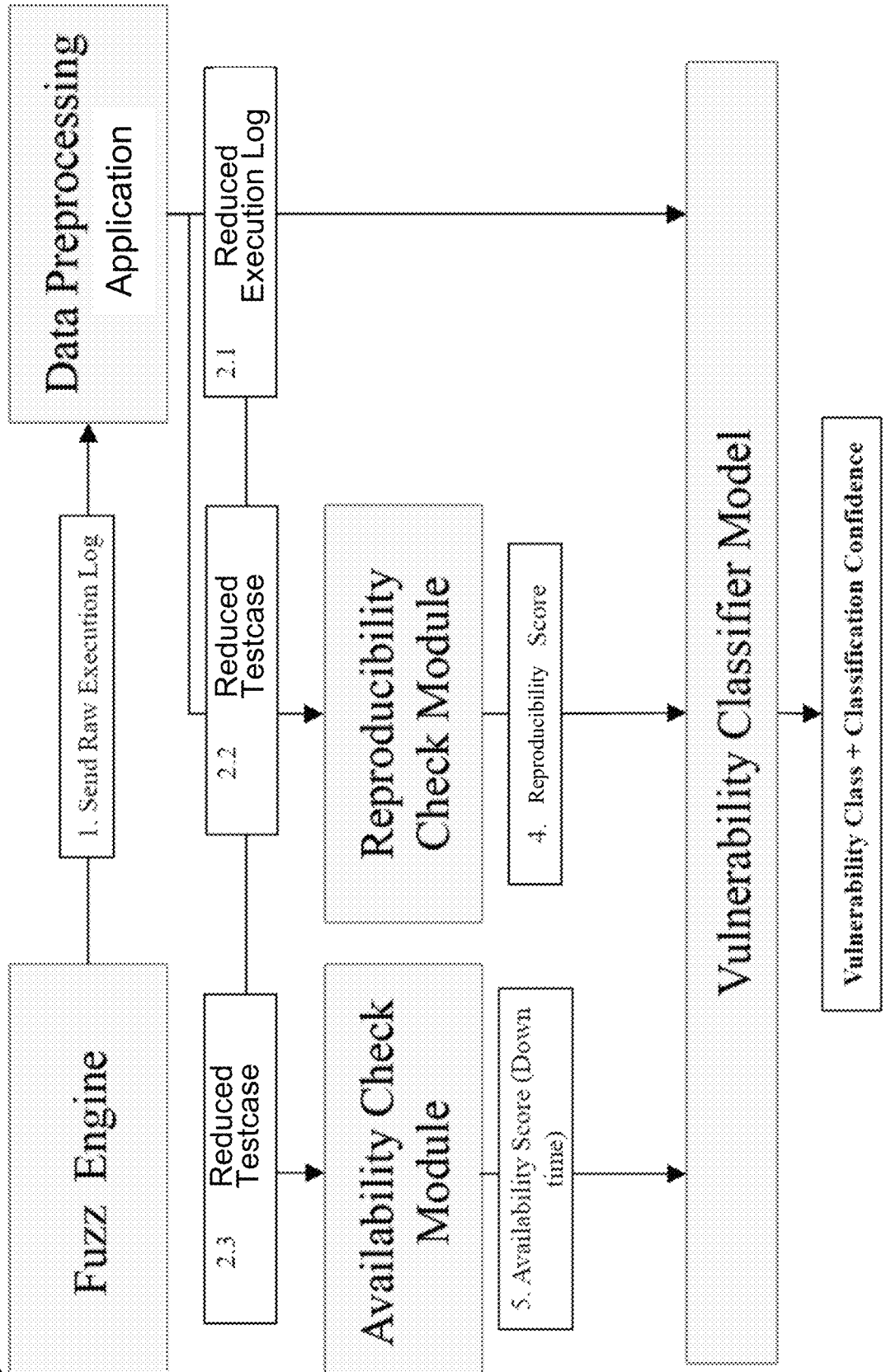
FIG. 8 is an example flowchart illustrating a method for generating a classification associated with the vulnerability and a confidence value associated with the classification.

In some implementations, rather than generating a second risk score, the first electronic processor 200 generates a classification associated with the vulnerability and a confidence value associated with the classification using the reduced execution log, the seriousness of the vulnerability (the availability score), and the likelihood that the fuzzed data triggers the vulnerability in the first electronic device 110 (the reproducibility score). In these implementations, the vulnerability classifier model 224 is trained using tuples labeled with vulnerability classifications. A tuple may include a reduced execution log, a seriousness of a vulnerability, and a likelihood that fuzzed data triggers the vulnerability in an electronic device. FIG. 8 includes an example flowchart 800 illustrating a method for generating a classification associated with the vulnerability and a confidence value associated with the classification as a final output rather than a second risk score as the final output. Whether the first electronic processor 200 executes the method 300 illustrated in FIG. 3 and FIG. 7 or the method 800 illustrated in FIG. 8 may depend on the vulnerability that is exposed and other factors determined during fuzz testing.

In some implementations, the first electronic processor 200 outputs the second risk score, the seriousness of the vulnerability, the likelihood that the fuzzed data triggers the vulnerability in the electronic device, the first risk score, the classification, the confidence value associated with the classification, a combination of the foregoing, or the like via the display device 215. Based on the information displayed on the display device 215, a software technician or security tester may modify computer executable instructions associated with the first electronic device 110.

Figure 9:
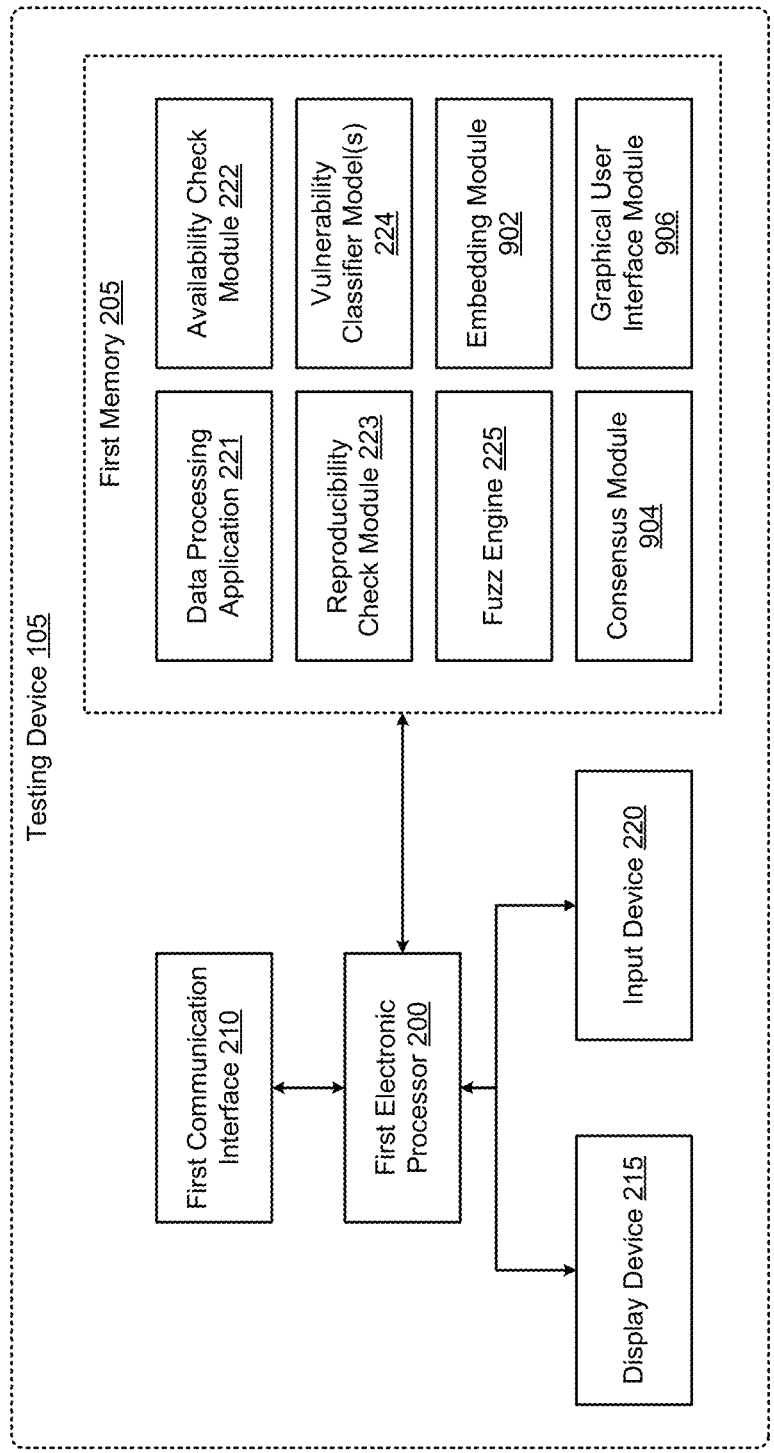
FIG. 9 is a block diagram of an example of the testing device of FIG. 1.

FIG. 9 is a block diagram of an example of the testing device 105 of FIG. 1. In various implementations, the testing device 105 shown in FIG. 9 may be substantially similar to the testing device 105 of FIG. 2A except that—in the example of FIG. 9—the first memory further includes an embedding module 902, a consensus module 904, and/or a graphical user interface module 906. The embedding module 902 may be a natural language processing tool suitable for converting the contextual information represented by a body of text to a vector. For example, the embedding module 902 may extract text and paragraph identification information from a document, convert the extracted text and paragraph identification information to vectors, and provide the vectors representing the extracted text and paragraph identification information to a machine learning model—such as a neural network—to generate an output vector that represents the contextual information of the document. Additional details related to the embedding module 902 will be described further on with reference to FIGS. 10-12.

The consensus module 904 may combine multiple outputs of multiple machine learning models and/or multiple outputs of a single machine learning model into a single, consolidated output. In various implementations, the consensus module 904 may be a voting classifier, such as a hard voting classifier or a soft voting classifier. In various implementations, each of the multiple outputs of the machine learning model(s) may include an individual classifier, and the output of the consensus module 904 may be the classifier forming a majority. For example, in a set of four outputs {a, b, b, b}, there are more outputs having a value of b than a—so the consensus module 904 may return a value of b.

In various implementations, each of the multiple outputs of the machine learning model(s) may include a probability associated with each output. For example, each of the multiple outputs may include a probability $p_a$ of the output being a and a probability $p_b$ of the output being b. If the average of the probabilities of the output being a ($\overline{p_a}$) is greater than the average of the probabilities of the output being b ($\overline{p_b}$), then consensus module 904 returns an output of a. Otherwise, if the average of the probabilities of the output being b ($\overline{p_b}$) is greater than the average of the probabilities of the output being a ($\overline{p_a}$), then consensus module 904 returns an output of b. So, for example, if the multiple outputs of the machine learning model(s) are {($p_a$=0.8, $p_b$=0.2), ($p_a$=0.9, $p_b$=0.1), ($p_a$=0.2, $p_b$=0.8)}, then the average probability of the output being a is about 0.63 ($\overline{p_a}$≅0.63) and the average probability of the output being b is about 0.37 ($\overline{p_b}$≅0.37). Thus, as the average probability of the output being a is greater than the average probability of the output being b ($\overline{p_a}>\overline{p_b}$), then the consensus module 904 returns a value of a.

The graphical user interface module 906 may be configured to parse the output payload of the consensus module 904, generate a display payload, and provide the display payload to the display device 215. In various implementations, the display payload may be a signal that can be interpreted by the display device 215 to display a graphical representation of the output of the consensus module 904 to a user of the testing device 105. In various implementations—for example, as related to computing and telecommunications applications—the "payload" may refer to the part of the transmitted data that is the actual intended message. By contrast, headers and metadata may refer to portions of the transmitted data sent to enable delivery of the payload.

Figure 10:
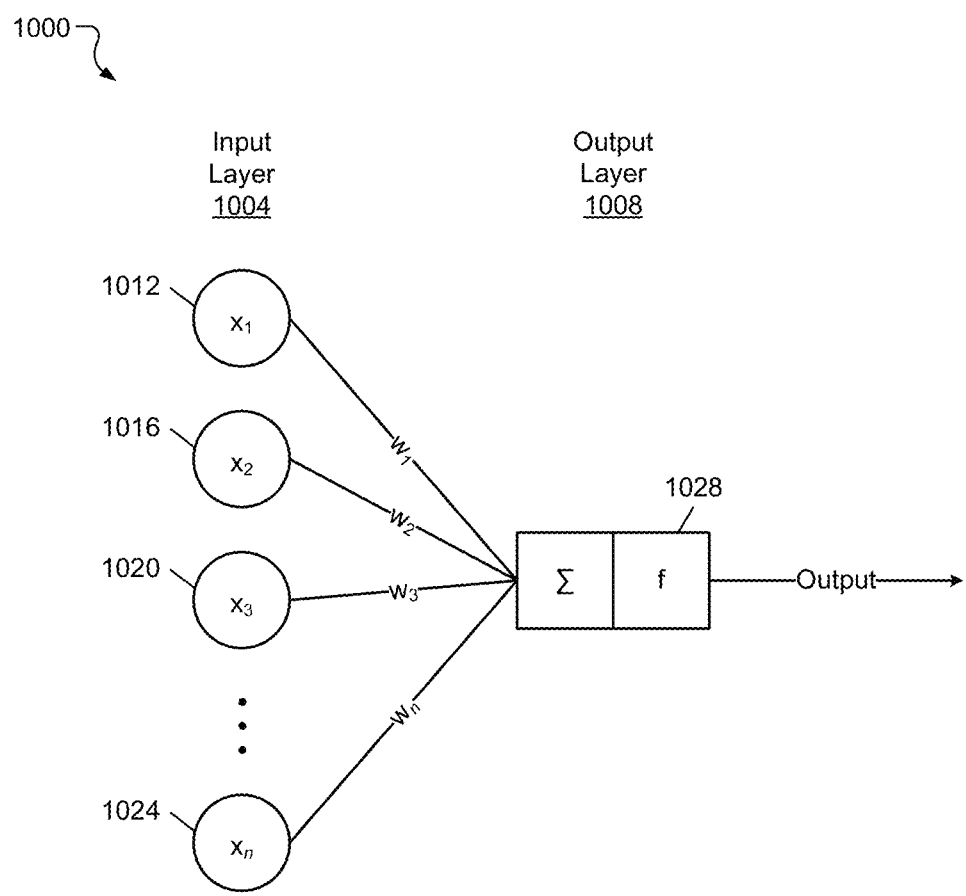
FIG. 10 is a graphical representation of an example neural network for implementing a vulnerability classifier model and/or an embedding module.

FIG. 10 is a graphical representation of an example neural network for implementing the vulnerability classifier model 224 and/or the embedding module 902. FIG. 10 shows a graphical representation of an example neural network with no hidden layers. Generally, neural networks may include an input layer, an output layer, and any number—including none—of hidden layers between the input layer and the output layer. Each layer of the machine learning model may include one or more nodes with each node representing a scalar. Input variables may be provided to the input layer. Any hidden layers and/or the output layer may transform the inputs into output variables, which may then be output from the neural network at the output layer. In various implementations, the input variables to the neural network may be an input vector having dimensions equal to the number of nodes in the input layer. In various implementations, the output variables of the neural network may be an output vector having dimensions equal to the number of nodes in the output layer.

Generally, the number of hidden layers—and the number of nodes in each layer—may be selected based on the complexity of the input data, time complexity requirements, and accuracy requirements. Time complexity may refer to an amount of time required for the neural network to learn a problem—which can be represented by the input variables—and produce acceptable results—which can be represented by the output variables. Accuracy may refer to how close the results represented by the output variables are to real results. In various implementations, increasing the number of hidden layers and/or increasing the number of nodes in each layer may increase the accuracy of neural networks but also increase the time complexity. Conversely, in various implementations, decreasing the number of hidden layers and/or decreasing the number of nodes in each layer may decrease the accuracy of neural networks but also decrease the time complexity.

As shown in FIG. 10, some examples of neural networks, such as neural network 1000, may have no hidden layers. Neural networks with no hidden layers may be suitable for solving problems with input variables that represent linearly separable data. For example, if data can be represented by sets of points existing in a Euclidean plane, then the data may be considered linearly separable if the sets of points can be divided by a single line in the plane. If the data can be represented by sets of points existing in higher-dimensional Euclidean spaces, the data may be considered linearly separable if the sets can be divided by a single plane or hyperplane. Thus, in various implementations, the neural network 1000 may function as a linear classifier and may be suitable for performing linearly separable decisions or functions.

As shown in FIG. 10, the neural network 1000 may include an input layer—such as input layer 1004, an output layer—such as output layer 1008, and no hidden layers. Data may flow forward in the neural network 1000 from the input layer 1004 to the output layer 1008, and the neural network 1000 may be referred to as a feedforward neural network. Feedforward neural networks having no hidden layers may be referred to as single-layer perceptrons. In various implementations, the input layer 1004 may include one or more nodes, such as nodes 1012-1024. Although only four nodes are shown in FIG. 10, the input layer 1004 may include any number of nodes, such as n nodes. In various implementations, each node of the input layer 1004 may be assigned any numerical value. For example, node 1012 may be assigned a scalar represented by $x_1$, node 1016 may be assigned a scalar represented by $x_2$, node 1020 may be assigned a scalar represented by $x_3$, and node 1024 may be assigned a scalar represented by $x_n$.

In various implementations, each of the nodes 1012-1024 may correspond to an element of the input vector. For example, the input variables to a neural network may be expressed as input vector i having n dimensions. So for neural network 1000—which has an input layer 1004 with nodes 1012-1024 assigned scalar values $x_1$-$x_n$, respectively—input vector i may be represented by equation (1) below:

$$i = \langle x_1, x_2, x_3, x_n \rangle. \quad (1)$$

In various implementations, input vector i may be a signed vector, and each element may be a scalar value in a range of between about −1 and about 1. So, in some examples, the ranges of the scalar values of nodes 1012-1024 may be expressed in interval notation as: $x_1 \in [-1,1]$, $x_2 \in [-1,1]$, $x_3 \in [-1,1]$, and $x_n \in [-1,1]$.

Each of the nodes of a previous layer of a feedforward neural network—such as neural network 1000—may be multiplied by a weight before being fed into one or more nodes of a next layer. For example, the nodes of the input layer 1004 may be multiplied by weights before being fed into one or more nodes of the output layer 1008. In various implementations, the output layer 1008 may include one or more nodes, such as node 1028. While only a single node is shown in FIG. 10, the output layer 1008 may have any number of nodes. In the example of FIG. 10, node 1012 may be multiplied by a weight $w_1$ before being fed into node 1028, node 1016 may be multiplied by a weight $w_2$ before being fed into node 1028, node 1020 may be multiplied by a weight $w_3$ before being fed into node 1028, and node 1024 may be multiplied by a weight $w_n$ before being fed into node 1028. At each node of the next layer, the inputs from the previous layer may be summed, and a bias may be added to the sum before the summation is fed into an activation function. The output of the activation function may be the output of the node.

In various implementations—such as in the example of FIG. 10, the summation of inputs from the previous layer may be represented by Σ. In various implementations, if a bias is not added to the summed outputs of the previous layer, then the summation Σ may be represented by equation (2) below:

$$\Sigma = x_1 w_1 + x_2 w_2 + x_3 w_3 + x_n w_n. \quad (2)$$

In various implementations, if a bias b is added to the summed outputs of the previous layer, then summation Σ may be represented by equation (3) below:

$$\Sigma = x_1 w_1 + x_2 w_2 + x_3 w_3 + x_n w_n + b. \quad (3)$$

The summation Σ may then be fed into activation function $f$. In various implementations, the activation function $f$ may be any mathematical function suitable for calculating an output of the node. Example activation functions $f$ may include linear or non-linear functions, step functions such as the Heaviside step function, derivative or differential functions, monotonic functions, sigmoid or logistic activation functions, rectified linear unit (ReLU) functions, and/or leaky ReLU functions. The output of the function $f$ may then be the output of the node. In a neural network with no hidden layers—such as the single-layer perceptron shown in FIG. 10—the output of the nodes in the output layer may be the output variables or output vector of the neural network. In the example of FIG. 10, the output of node 1028 may be represented by equation (4) below if the bias b is not added, or equation (5) below if the bias b is added:

$$\text{Output} = f(\Sigma = x_1 w_1 + x_2 w_2 + x_3 w_3 + x_n w_n), \text{ and} \quad (4)$$

$$\text{Output} = f(\Sigma = x_1 w_1 + x_2 w_2 + x_3 w_3 + x_n w_n + b). \quad (5)$$

Thus, as neural network 1000 is illustrated in FIG. 10 with an output layer 1008 having only a single node 1028, the output vector of neural network 1000 is a one-dimensional vector (e.g., a scalar). However, as the output layer 1008 may have any number of nodes, the output vector may have any number of dimensions.

Figure 11:
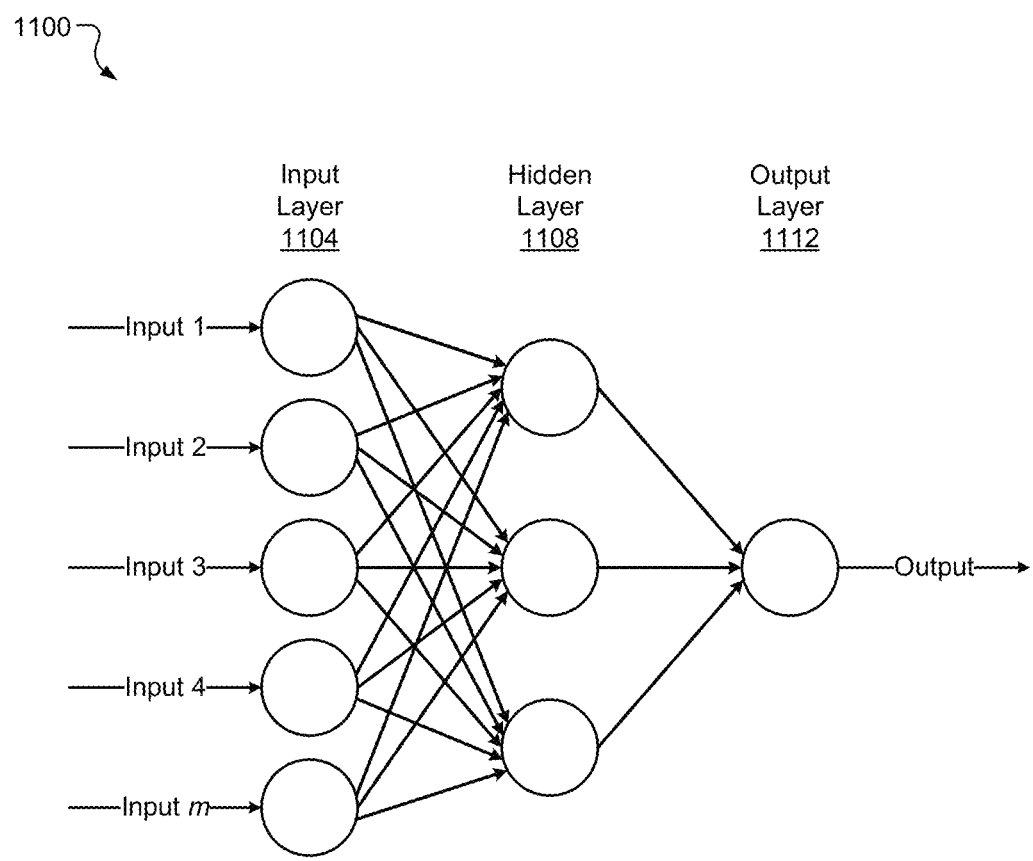
FIG. 11 is a graphical representation of an example neural network for implementing a vulnerability classifier model and/or an embedding module.

FIG. 11 is a graphical representation of an example neural network with one hidden layer. Neural networks with one hidden layer may be suitable for performing continuous mapping from one finite space to another. Neural networks having two hidden layers may be suitable for approximating any smooth mapping to any level of accuracy. As shown in FIG. 11, the neural network 1100 may include an input layer—such as input layer 1104, a hidden layer—such as hidden layer 1108, and an output layer—such as output layer 1112. In the example of FIG. 11, each node of a previous layer of neural network 1100 may be connected to each node of a next layer. So, for example, each node of the input layer 1104 may be connected to each node of the hidden layer 1108, and each node of the hidden layer 1108 may be connected to each node of the output layer 1112. Thus, the neural network shown in FIG. 11 may be referred to as a fully-connected neural network. However, while neural network 1100 is shown as a fully-connected neural network, each node of a previous layer does not necessarily need to be connected to each node of a next layer. A feedforward neural network having at least one hidden layer—such as neural network 1100—may be referred to as a multilayer perceptron.

In a manner analogous to neural networks described with reference to FIG. 10, input vectors for neural network 1100 may be m-dimensional vectors, where m is a number of nodes in input layer 1104. Each element of the input vector may be fed into a corresponding node of the input layer 1104. Each node of the input layer 1104 may then be assigned a scalar value corresponding to the respective element of the input vector. Each node of the input layer 1104 may then feed its assigned scalar value—after it is multiplied by a weight—to one or more nodes of the next layer, such as hidden layer 1108. Each node of hidden layer 1108 may take a summation of its inputs (e.g., a weighted summation of the nodes of the input layer 1104) and feed the summation into an activation function. In various implementations, a bias may be added to the summation before it is fed into the activation function. In various implementations, the output of each node of the hidden layer 1108 may be calculated in a manner similar or analogous to that described with respect to the output of node 1028 of FIG. 10.

Each node of the hidden layer 1108 may then feed its output—after it is multiplied by a weight—to one or more nodes of the next layer, such as output layer 1112. Each node of the output layer 1112 may take a summation of its inputs (e.g., a weighted summation of the outputs of the nodes of hidden layer 1108) and feed the summation into an activation function. In various implementations, a bias may be added to the summation before it is fed into the activation function. In various implementations, the output of each node of the output layer 1112 may be calculated in a manner similar or analogous to that described with respect to the output of node 1028 of FIG. 10. The output of the nodes of the output layer 1112 may be the output variables or the output vector of neural network 1100. While only a single hidden layer is shown in FIG. 11, neural network 1100 may include any number of hidden layers. A weighted summation of the outputs of each previous hidden layer may be fed into nodes of the next hidden layer, and a weighted summation of the outputs of those nodes may be fed into a further hidden layer. A weighted summation of the outputs of a last hidden layer may be fed into nodes of the output layer.

Figure 12:
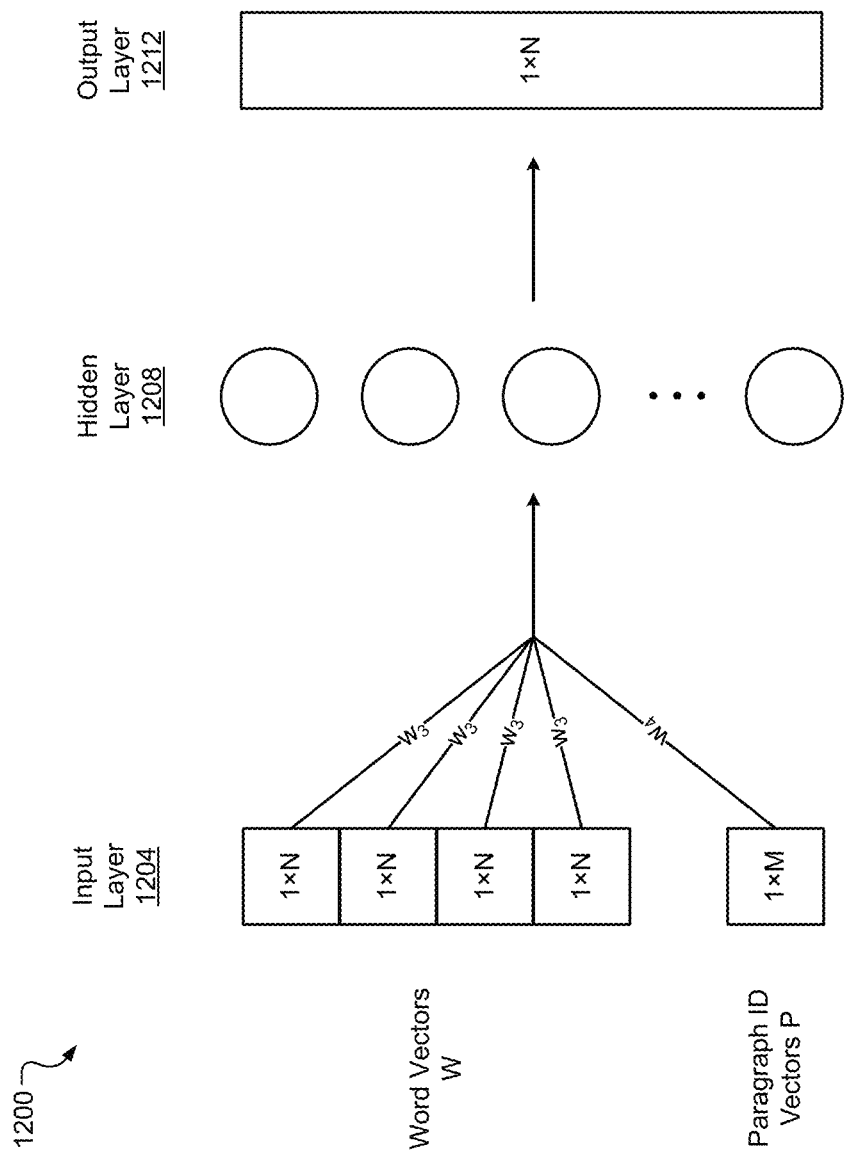
FIG. 12 is a graphical representation of an example neural network for implementing an embedding module.

FIG. 12 is a graphical representation of an example neural network 1200 used to implement the embedding module 902. In various implementations, the example neural network of FIG. 12 may function according to the principles previously described with reference to FIGS. 10 and 11. The neural network 1200 may include an input layer 1204, a hidden layer 1208, and an output layer 1212. In various implementations, the input layer 1204 may receive one or more word vectors W and one or more paragraph ID vectors P. The word vectors W may be 1×N vectors (vectors having a dimension of N). Each word vector W may represent one or more sections of text from a document provided to the embedding module 902. The paragraph ID vectors P may be 1×M vectors (vectors having a dimension of M). Each paragraph ID vector P may include information identifying one or more specific paragraphs from the document provided to the embedding module 902.

In various implementations, the values of the nodes of the input layer 1204 that correspond to word vectors W may be multiplied by a weight $w_3$ before being provided to node(s) of the hidden layer 1208, and the values of the nodes of the input layer 1204 that correspond to paragraph ID vectors P may be multiplied by a weight $w_4$ before being provided to node(s) of the hidden layer 1208. In various implementations, the output layer 1212 may return a vector having same dimensions as each word vector, such as a 1×N vector.

Figure 13:
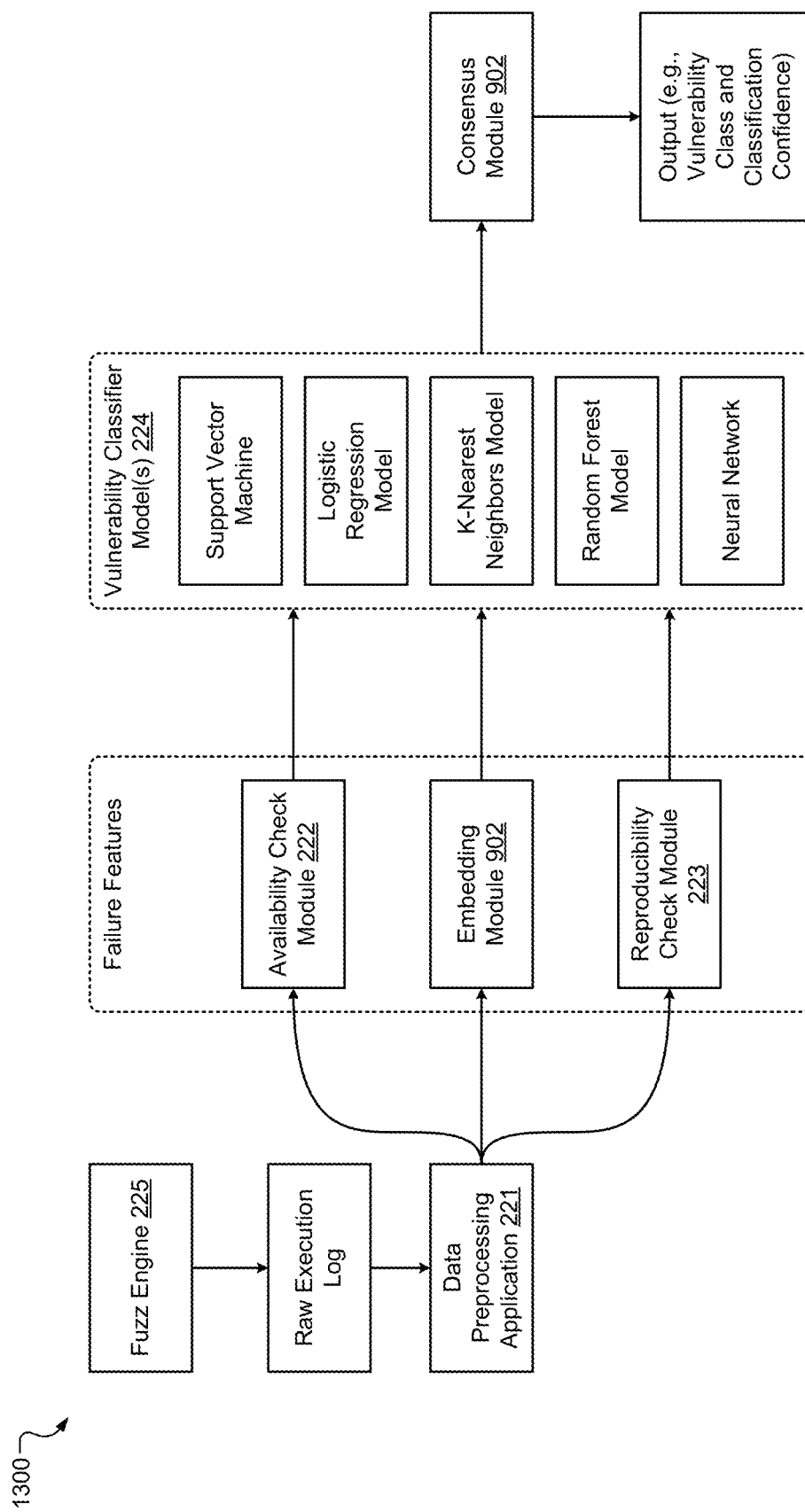
FIG. 13 is a functional block diagram showing a system for automatically classifying and/or scoring network vulnerabilities.
Figure 14A:
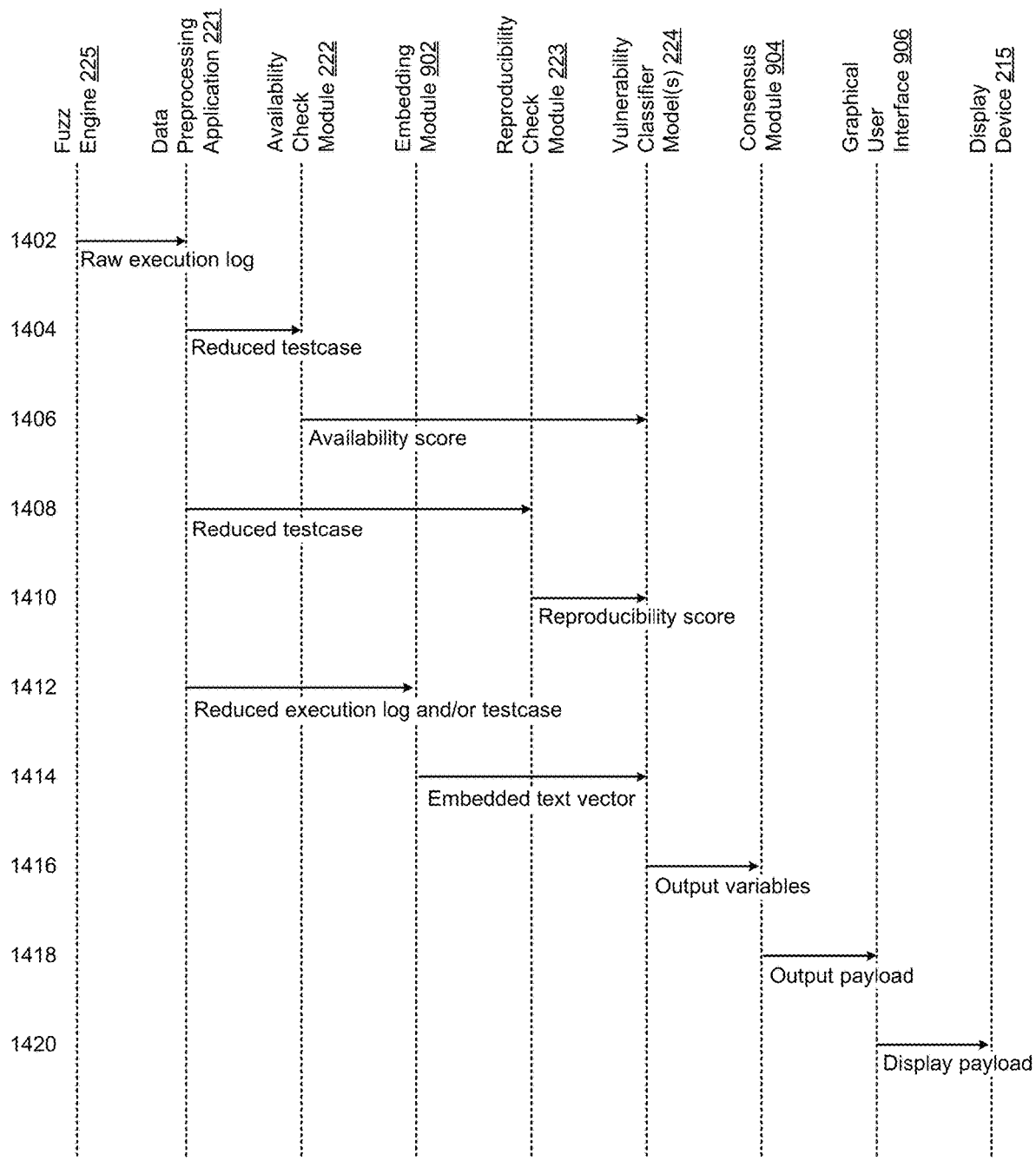
FIG. 14A is a message sequence chart showing example interactions between components of a system for automatically classifying and/or scoring network vulnerabilities.
Figure 14B:
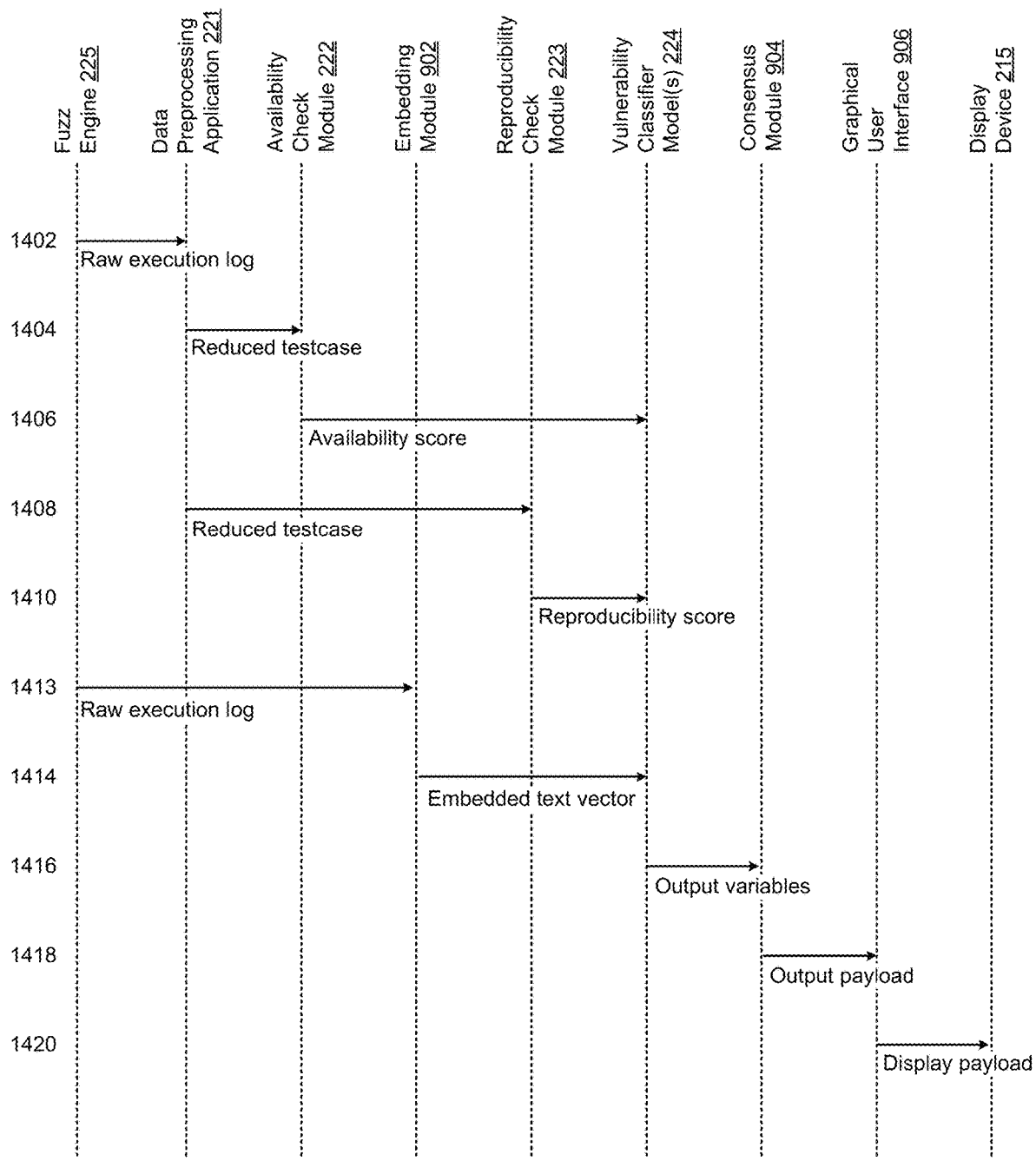
FIG. 14B is a message sequence chart showing example interactions between components of a system for automatically classifying and/or scoring network vulnerabilities.

FIG. 13 is a functional block diagram showing a system 1300 for automatically classifying and/or scoring network vulnerabilities. In various implementations, the system 1300 may be implemented by modules stored in the first memory 205 of the testing device 105. In various implementations, the modules shown in the system 1300 may be distributed across multiple devices and connected via one or more networks. FIGS. 14A and 14B are message sequence charts showing example interactions between components of the system 1300. At 1402, the fuzz engine 225 generates and sends a raw execution log to the data preprocessing application 221. In various implementations, the raw execution log may be generated as previously described. In various implementations, the raw execution log may include a transmission frame, a receipt frame, and one or more subsequent health-check frames. For example, referring back to FIGS. 4-6, the first line of the reduced execution log 415 may be an example of the transmission frame (e.g., the frame showing the initial transmission from the test device to the device being tested), the second line of the reduced execution log 415 may be an example of the receipt frame (e.g., the frame showing the initial response from the device being tested to the test device), and the remaining lines of the reduced execution log 415 may be health-check frames (e.g., frames including payloads indicative of the health of the device being tested).

At 1404, the data preprocessing application 221 generates and sends a reduced testcase to the availability check module 222. In various implementations, the reduced testcase may be generated as previously described. At 1406, the availability check module 222 generates and sends an availability score to the vulnerability classifier model(s) 224. In various implementations, the availability score may be generated as previously described. At 1408, the data preprocessing application 221 sends the reduced testcase to the reproducibility check module 223. At 1410, the reproducibility check module 223 generates and sends the reproducibility score to the vulnerability classifier model(s) 224. In various implementations, the reproducibility score may be generated as previously described. In various embodiments (as shown in FIG. 14A), at 1412, the data preprocessing application 221 sends a reduced execution log and/or the reduced testcase to the embedding module 902. In various implementations, the reduced execution log may be generated as previously described. In various implementations (as shown in FIG. 14B), at 1413, the fuzz engine 225 sends the raw execution log to the embedding module 902.

At 1414, the embedding module 902 generates an embedded text vector from the reduced testcase and/or the raw execution log and sends the embedded text vector to the vulnerability classifier model(s) 224. In various implementations, the embedding module 902 may extract any combination of text from the reduced execution log, reduced testcase, and/or raw execution log. At 1416, the vulnerability classifier model(s) 224 generate output variables from input vectors, such as input vectors generated based on the availability score, the reproducibility score, and/or the embedded text vector. In various implementations, the vulnerability classifier model(s) 224 may include one or more trained machine learning models—such as a support vector machine, a logistic regression model, a K-nearest neighbors model, a random forest model, and/or a neural network. The vulnerability classifier model(s) 224 sends the output variables to the consensus module 904.

At 1418, the consensus module 904 generates an output payload and sends the output payload to the graphical user interface module 906. In various implementations, the consensus module 904 may receive multiple sets of output variables from multiple runs of the vulnerability classifier model(s) 224 and generate the output payload based on the multiple sets of output variables. In various implementations, the output payload indicates a vulnerability class and a classification confidence. At 1420, the graphical user interface module 906 generates a display payload and sends the display payload to the display device 215. In various implementations, the display device 215 generates a graphical output representing the vulnerability class and the classification confidence based on the display payload.

In some implementations, the first electronic processor 200 receives new or revised computer executable instructions and sends the new or revised computer executable instructions to an electronic device (for example, the first electronic device 110). The new or revised computer executable instructions replace computer executable instructions that were previously stored in the memory of the electronic device. The new computer executable instructions are designed to prevent the electronic device from malfunctioning when, in the future, the electronic device receives data similar to the fuzzed data which caused it to be recorded in the failure log. In some implementations, the first electronic processor 200 receives an new encryption key, new seed value, or both and sends the new encryption key, new seed value, or both to an electronic device (for example, the first electronic device 110). The new encryption key, new seed value, or both replace the encryption key, seed value, or both that were previously stored in the memory of the electronic device.

Thus, the embodiments described herein provide, among other things, a system and a method for automatically classifying and scoring network vulnerabilities. Various features and advantages of the embodiments are set forth in the following claims.

What is claimed is:

1. A system comprising:
a first electronic device having a display; and
an electronic processor configured to:
determine an execution log including fuzzed data that exposes a vulnerability associated with a second electronic device, the execution log including:
a transmission frame,
a receipt frame, and
one or more subsequent health-check frames,
extract text information from the execution log,
generate an input vector from the extracted text information,
provide the input vector to a trained neural network having (i) an input layer, (ii) a hidden layer, and (iii) an output layer to generate an output vector by:
providing the input vector to nodes of the input layer,
generating outputs from nodes of the input layer by multiplying the input vector by a weight,
providing outputs from nodes of the input layer to nodes of the hidden layer,
providing outputs from nodes of the hidden layer to nodes of the output layer, and
generating the output vector from nodes of the output layer,
provide the output vector to a second trained machine learning model to determine output variables indicative of (i) a likelihood that the fuzzed data triggers the vulnerability in the second electronic device and (ii) a classification associated with the vulnerability,
generate a display payload based on the output variables,
generate revised computer executable instructions configured to prevent the second electronic device from malfunctioning in response to the second electronic device receiving data similar to the fuzzed data, and
send the revised computer executable instructions to the second electronic device;
wherein the display is configured to generate, based on the display payload, a visual representation indicative of (i) the likelihood that the fuzzed data triggers the vulnerability in the second electronic device and (ii) the classification associated with the vulnerability.

2. The system of claim 1, wherein the electronic processor is configured to:
generate an availability metric based on the execution log;
generate a reproducibility metric based on the execution log; and
provide the availability metric and the reproducibility metric to the second trained machine learning model to determine the output variables.

3. The system of claim 2, wherein the electronic processor is configured to:
generate multiple output variables based on the execution log;
determine a consensus metric based the multiple output variables; and
generate an output payload based on the consensus metric.

4. The system of claim 3, wherein:
the multiple output variables include (i) a first likelihood that the fuzzed data triggers the vulnerability in the second electronic device, (ii) a second likelihood that the fuzzed data triggers the vulnerability in the second electronic device, and (iii) a classification associated with the vulnerability;
the electronic processor is configured to determine an average probability that the fuzzed data triggers the vulnerability in the second device based on the first likelihood and the second likelihood; and
in response to the average probability that the fuzzed data triggers the vulnerability in the second device being greater than an average probability that the fuzzed data does not trigger the vulnerability in the second device, generate the consensus metric;
wherein the consensus metric is indicative of the classification associated with the vulnerability.

5. A system for automatically classifying and scoring network vulnerabilities, the system comprising:
an electronic processor configured to:
determine an execution log including fuzzed data which exposed a vulnerability associated with an electronic device;
determine a seriousness of the vulnerability;
send a reduced testcase to the electronic device a predetermined number of times to determine a likelihood that the fuzzed data triggers the vulnerability in the electronic device, wherein the likelihood is a percentage representing how often the reduced testcase exposes the vulnerability and the reduced test case includes fuzzed data which exposed the vulnerability;
determine a classification associated with the vulnerability, wherein the classification is associated with a first risk score;
based on the seriousness of the vulnerability, the likelihood that the fuzzed data triggers the vulnerability in the electronic device, and the first risk score, determine a second risk score associated with the vulnerability; and
generate revised computer executable instructions configured to prevent the electronic device from malfunctioning in response to the electronic device receiving data similar to the fuzzed data.

6. The system according to claim 5, wherein the electronic processor is further configured to:
send the revised computer executable instructions to the electronic device, wherein the electronic device replaces computer executable instructions that were previously stored in its memory with the revised computer executable instructions.

7. The system according to claim 5, wherein the electronic processor is configured to determine a classification associated with the vulnerability using machine learning.

8. The system according to claim 7, wherein the electronic processor is further configured to:
determine a confidence value associated with the classification;
determine, based on the first risk score and the confidence value, a modified first risk score; and
based on the seriousness of the vulnerability, the likelihood that the fuzzed data triggers the vulnerability in the electronic device, the first risk score, and the modified first risk score, determine the second risk score associated with the vulnerability.

9. The system according to claim 5, wherein the electronic processor is further configured to:
parse the execution log to determine one or more testcases included in the execution log, wherein one or more of the parsed testcases includes fuzzed data which exposed a vulnerability associated with the electronic device; and for each parsed testcase including fuzzed data which exposed a vulnerability associated with the electronic device,
generate the reduced testcase including the fuzzed data which exposed a vulnerability; and
generate a reduced execution log.

10. The system according to claim 9, wherein the electronic processor is configured to determine a seriousness of the vulnerability by
sending the reduced testcase to the electronic device; and
determining an amount of time that the electronic device is unresponsive for when the electronic device receives the reduced testcase.

11. The system according to claim 9, wherein the electronic processor is configured to determine a classification associated with the vulnerability by using machine learning to analyze the reduced execution log.

12. A method for automatically classifying and scoring network vulnerabilities, the method comprising:
determining an execution log including fuzzed data which exposed a vulnerability associated with an electronic device;
determining a seriousness of the vulnerability;
sending a reduced testcase to the electronic device a predetermined number of times to determine a likelihood that the fuzzed data triggers the vulnerability in the electronic device, wherein the likelihood is a percentage representing how often the reduced testcase exposes the vulnerability and the reduced test case includes fuzzed data which exposed the vulnerability;
determining a classification associated with the vulnerability, wherein the classification is associated with a first risk score;
based on the seriousness of the vulnerability, the likelihood that the fuzzed data triggers the vulnerability in the electronic device, and the first risk score, determining a second risk score associated with the vulnerability; and
generating revised computer executable instructions configured to prevent the electronic device from malfunctioning in response to the electronic device receiving data similar to the fuzzed data.

13. The method according to claim 12,
sending the revised computer executable instructions to the electronic device, wherein the electronic device replaces computer executable instructions that were previously stored in its memory with the revised computer executable instructions.

14. The method according to claim 12, wherein determining a classification associated with the vulnerability includes using machine learning.

15. The method according to claim 14, the method further comprising:
determining a confidence value associated with the classification;
determining, based on the first risk score and the confidence value, a modified first risk score; and
based on the seriousness of the vulnerability, the likelihood that the fuzzed data triggers the vulnerability in the electronic device, the first risk score, and the modified first risk score, determining the second risk score associated with the vulnerability.

16. The method according to claim 12, the method further comprising:
parsing the execution log to determine one or more testcases included in the execution log, wherein one or more of the parsed testcases includes fuzzed data which exposed a vulnerability associated with the electronic device; and
for each parsed testcase including fuzzed data which exposed a vulnerability associated with the electronic device,
generating the reduced testcase including the fuzzed data which exposed a vulnerability; and
generating a reduced execution log.

17. The method according to claim 16, wherein determining a seriousness of the vulnerability includes
sending the reduced testcase to the electronic device; and
determining an amount of time that the electronic device is unresponsive for when the electronic device receives the reduced testcase.

18. The method according to claim 16, wherein determining a classification associated with the vulnerability includes using machine learning to analyze the reduced execution log.

* * * * *